US010187545B2

(12) United States Patent
Pekarske et al.

(10) Patent No.: US 10,187,545 B2
(45) Date of Patent: Jan. 22, 2019

(54) METHOD AND APPARATUS TO COMMUNICATE DATA ASSOCIATED WITH MEDIA PROCESSING DEVICES

(71) Applicant: ZIH CORP., Lincolnshire, IL (US)

(72) Inventors: Andrew J. Pekarske, Mundelein, IL (US); Gordon E. Molek, Vernon Hills, IL (US); Jared Coy Roundy, Meridian, ID (US); James P. Van Huis, Des Plaines, IL (US)

(73) Assignee: ZIH Corp., Lincolnshire, IL (US)

( * ) Notice: Subject to any disclaimer, the term of this patent is extended or adjusted under 35 U.S.C. 154(b) by 0 days.

(21) Appl. No.: 15/258,682

(22) Filed: Sep. 7, 2016

(65) Prior Publication Data

US 2018/0069981 A1 Mar. 8, 2018

(51) Int. Cl.
*H04N 1/327* (2006.01)
*H04N 1/00* (2006.01)
(Continued)

(52) U.S. Cl.
CPC ......... *H04N 1/32793* (2013.01); *G06F 3/123* (2013.01); *G06F 3/1204* (2013.01);
(Continued)

(58) Field of Classification Search
CPC ........... H04N 1/32793; H04N 1/00015; H04N 1/00042; H04N 1/00061; H04N 1/00323; H04N 1/00344; H04N 1/32797
See application file for complete search history.

(56) References Cited

U.S. PATENT DOCUMENTS 5,652,711 A 7/1997 Vennekens
5,983,243 A 11/1999 Heiney et al.
(Continued)

FOREIGN PATENT DOCUMENTS

CN 1452552 A 10/2003
EP 1274002 A2 1/2003
WO 2010/064085 A1 6/2010

OTHER PUBLICATIONS

International Search Report and Written Opinion for International Patent Application No. PCT/US2017/040821 dated Oct. 4, 2017.
(Continued)

*Primary Examiner* — Iriana Cruz (57) ABSTRACT

Methods and apparatus to communicate data associated with media processing devices are disclosed. An example media processing device residing on a network includes a monitor configured to collect observational data associated with the media processing device in accordance with a configuration file stored on the media processing device; and communicate the observational data to a first device external to the network via a first persistent connection between the media processing device and the first external device; and a controller configured to receive an operational instruction from a second external device via a second persistent connection between the media processing device and the second external device, wherein the second persistent connection is independent of the first persistent connection; and implement the operational instruction on the media processing device, wherein the operation instruction controls media processing hardware of the media processing device.

27 Claims, 7 Drawing Sheets

(51) Int. Cl.
  *H04W 12/06* (2009.01)
  *H04W 76/14* (2018.01)
  *G06F 3/12* (2006.01)

(52) U.S. Cl.
  CPC .......... *G06F 3/1229* (2013.01); *G06F 3/1288* (2013.01); *H04N 1/00015* (2013.01); *H04N 1/00042* (2013.01); *H04N 1/00061* (2013.01); *H04N 1/00323* (2013.01); *H04N 1/00344* (2013.01); *H04N 1/32797* (2013.01); *H04W 12/06* (2013.01); *H04W 76/14* (2018.02); *H04N 2201/0039* (2013.01); *H04N 2201/0091* (2013.01)

(56) References Cited

U.S. PATENT DOCUMENTS

| | | | |
|---|---|---|---|
| 6,184,996 | B1 | 2/2001 | Gase |
| 6,209,048 | B1 | 3/2001 | Wolff |
| 6,587,647 | B1 | 7/2003 | Watanabe et al. |
| 6,738,841 | B1 | 5/2004 | Wolff |
| 6,798,997 | B1 | 9/2004 | Hayward et al. |
| 7,126,716 | B1 | 10/2006 | Kaufman et al. |
| 9,335,958 | B2 | 5/2016 | Anno et al. |
| 9,830,112 | B2 | 11/2017 | Sakai et al. |
| 2002/0015166 | A1 | 2/2002 | Wakai et al. |
| 2002/0016833 | A1 | 2/2002 | Yajima et al. |
| 2002/0163662 | A1 | 11/2002 | Kaufman et al. |
| 2002/0196451 | A1 | 12/2002 | Schlonski et al. |
| 2006/0279779 | A1 | 12/2006 | Kaufman et al. |
| 2007/0013941 | A1 | 1/2007 | Anno |
| 2007/0234053 | A1 | 10/2007 | Kudo |
| 2007/0266237 | A1 | 11/2007 | Kuroki |
| 2010/0030872 | A1 | 2/2010 | Caleca et al. |
| 2011/0176162 | A1 | 7/2011 | Kamath et al. |
| 2012/0036570 | A1 | 2/2012 | Wada |
| 2012/0081749 | A1 | 4/2012 | Kitada |
| 2012/0133974 | A1 | 5/2012 | Nakamura |
| 2012/0204032 | A1 | 8/2012 | Wilkins et al. |
| 2013/0163017 | A1 | 6/2013 | Matsuda |
| 2014/0240753 | A1* | 8/2014 | Anno .................... G06F 3/1236 358/1.15 |
| 2014/0351805 | A1* | 11/2014 | Nishikawa ................ G06F 8/65 717/170 |
| 2015/0268902 | A1 | 9/2015 | Sakamoto |
| 2016/0216922 | A1 | 7/2016 | Anno |
| 2017/0109106 | A1 | 4/2017 | Ohara |
| 2017/0279978 | A1* | 9/2017 | Osadchyy .......... H04N 1/00068 |

OTHER PUBLICATIONS

International Search Report and Written Opinion for International Patent Application No. PCT/US2013/027136 dated Jul. 22, 2013.
Fette, I. et al., The WebSocket Protocol, Internet Engineering Task Force (IETF), RFC 6455, ISSN: 2070-1721 (Dec. 2011) 71 pages.
Smith, R., The Future of the Web: HTML5 Web Sockets [online] [retrieved Nov. 24, 2010]. Retrieved from the Internet: [URL: https://ricsmith.sys-con.com/node/677813] (Aug. 16, 2008), pp. 1-6.

* cited by examiner

METHOD AND APPARATUS TO COMMUNICATE DATA ASSOCIATED WITH MEDIA PROCESSING DEVICES

FIELD OF THE DISCLOSURE

This disclosure relates generally to media processing devices and, more particularly, to methods and apparatus to communicate data associated with media processing devices.

BACKGROUND

An example media processing device includes components that generate indicia on media. Entities associated with the media processing device, such as persons or machines tasked with maintaining and/or managing the media processing device, benefit from having data indicative of, for example, a condition of certain components, performance of the indicia generation, consumption of supplies, and/or any other desired information.

DETAILED DESCRIPTION

Teachings of this disclosure are described herein in connection with media processing devices. However, teachings of this disclosure are applicable to any suitable type of device that performs one or more operations and is capable of communicating data regarding the one or more operations and/or one or more other aspects of the device. For example, while teachings of this disclosure are described below in connection with printers and data associated with printer components, teachings of this disclosure may be implemented in scanners that image and interpret indicia (e.g., barcodes, QR codes, codes stored on radio frequency identification (RFID) transponders), receivers of locating systems that receive and interpret radio frequency (RF) transmissions and determine locations of objects based on the received transmissions, and/or any other type of device that performs one or more functions and is capable of communicating data regarding the one or more operations and/or one or more other aspects of the device.

In some systems, a media processing device (MPD) present on a network is accessible by a machine not present on the network. That is, the MPD may be accessed by a remote or external machine (e.g., a machine not resident on the same network as the MPD, such as a remote server). Remote access to the MPD may involve exposing the MPD to the external machine through a network firewall or by setting up a virtual private network (VPN). In such instances, the external machine may be required to initiate the connection with the MPD, which often creates issues with the network firewall. For example, network firewalls are often configured to only allow outgoing connection requests and, thus, would cause the connection request from the external machine to be denied. Alternatively, the network firewall may view the external connection request as a non-standard Internet connection and block the connection. Establishing these external or remote connections may require changes to settings of the network firewall to allow such connections, which may raise security issues (e.g., exposing control of the MPD via a remote connection).

To enable a secure connection with the external machine (e.g., a server residing in a cloud) without requiring changes to network security settings (e.g., firewall settings) and without requiring setup of a VPN, some MPDs are configured to initiate a connection with the external machine and then establish a persistent connection with the external machine until, for example, the MPD is shut down. The MPD may be configured to initiate a connection with the external machine using data communication protocols or request-response protocols such as Hypertext Transfer Protocol (HTTP) or Hypertext Transfer Protocol Secure (HTTPS) and request that the connection then be converted to a Hypertext Markup Language (HTML) 5 WebSocket protocol (WebSocket) connection (defined by Internet Engineering Task Force RFC 6455). Such a WebSocket connection may allow the MPD and the remote server to communicate as if the MPD and the external machine were connected behind the same firewall, such as through a traditional Transmission Control Protocol (TCP) RAW port (e.g., port 9100).

A WebSocket connection may provide full-duplex communication channels over a single connection, such as a TCP connection. Such a connection is bidirectional, thereby allowing either side to transmit data as the data becomes available. Additionally, such a connection may allow data to be transmitted using various public or proprietary formats or languages, such as Java Script Object Notation (JSON) or Zebra Set Get Do (SGD). Notably, when control of the MPD is enabled or allowed over such a persistent connection, a malicious actor that gains access to the communication channel may control one or more operations of the MPD. Accordingly, persistent connections between the MPD and external machine(s) may pose a security challenge.

Example systems, methods, and apparatus disclosed herein efficiently and securely enable communication of data associated with a MPD to, for example, an external machine such as a remote server. As described in detail below, examples disclosed herein establish multiple persistent connections between the MPD and one or more external machine(s), where at least one of the persistent connections has one or more unique restrictions. In some examples disclosed herein, a first persistent connection (e.g., a WebSocket) is established between the MPD and a first external machine to allow the first external machine to manage and/or control certain operation(s) of the MPD. In examples disclosed herein, the first external machine may be referred to as a management machine (e.g., a print management server). Management and/or control of the operation(s) include, for example, an ability to change settings associated with hardware (e.g., a printhead, a motor, and/or sensors) and/or an ability to send particular types of commands (e.g., print commands) to the MPD. As such, the first persistent connection is sometimes referred to herein as an operational control connection. When the media processing device is a thermal printer, the example operational control connection enables the management machine to, for example, control a print operation by sending a print command or instruction and/or modify a print setting by sending a new value for the print setting.

Additionally, examples disclosed herein establish a second persistent connection (e.g., a WebSocket) between the MPD and a second external machine to enable the second external machine to observe one or more aspects of the MPD by receiving observational data indicative of the one or more aspects of the MPD. In examples disclosed herein, the second external machine may be referred to as an observational machine (e.g., a printer observation server). While examples disclosed herein describe first and second external machines, examples disclosed herein may apply to a single external machine handling management and observation functions. Observation of the MPD includes, for example, informing the MPD of desired observational data associated with the MPD and receiving the observational data from the MPD via the second persistent connection. As such, the second persistent connection is sometimes referred to herein as an observational data connection. As described in detail below, examples disclosed herein restrict communications over the observational data connection to particular types of data. Moreover, examples disclosed herein restrict a direction in which particular types of data are communicated over the observational data connection. For example, in some examples disclosed herein, only first and second types of data, such as (1) a discovery packet indicative of a version of a configuration file and (2) observational data indicative of an aspect of the MPD, are allowed over the observational data connection in a first direction from the MPD to the observation machine, and only a third type of data, such as a new configuration file, is allowed over the observational data connection in a second direction from the observation machine to the MPD. Alternatively, in some examples, only a first type of data (e.g., observational data) is allowed over the observational data connection in a first direction from the MPD to the observation machine and only a second type of data (e.g., a new configuration file) is allowed over the observational data connection in a second direction from the observation machine to the MPD.

Moreover, examples disclosed herein prevent communications over the observational data connection when certain prohibitive conditions associated with the MPD are present, such as a current performance of a printing operation that is prioritized over the observational data.

Notably, in examples disclosed herein, none of the communications transmitted over the observational data connection are capable of exerting operational control of the MPD. For example, when the MPD is a printer, the observational data connection disclosed herein does not allow the corresponding external machine (i.e., the observation machine) to control print operations (e.g., by sending print command and/or modifying a print setting), in contrast to the operational control connection.

Figure 1:
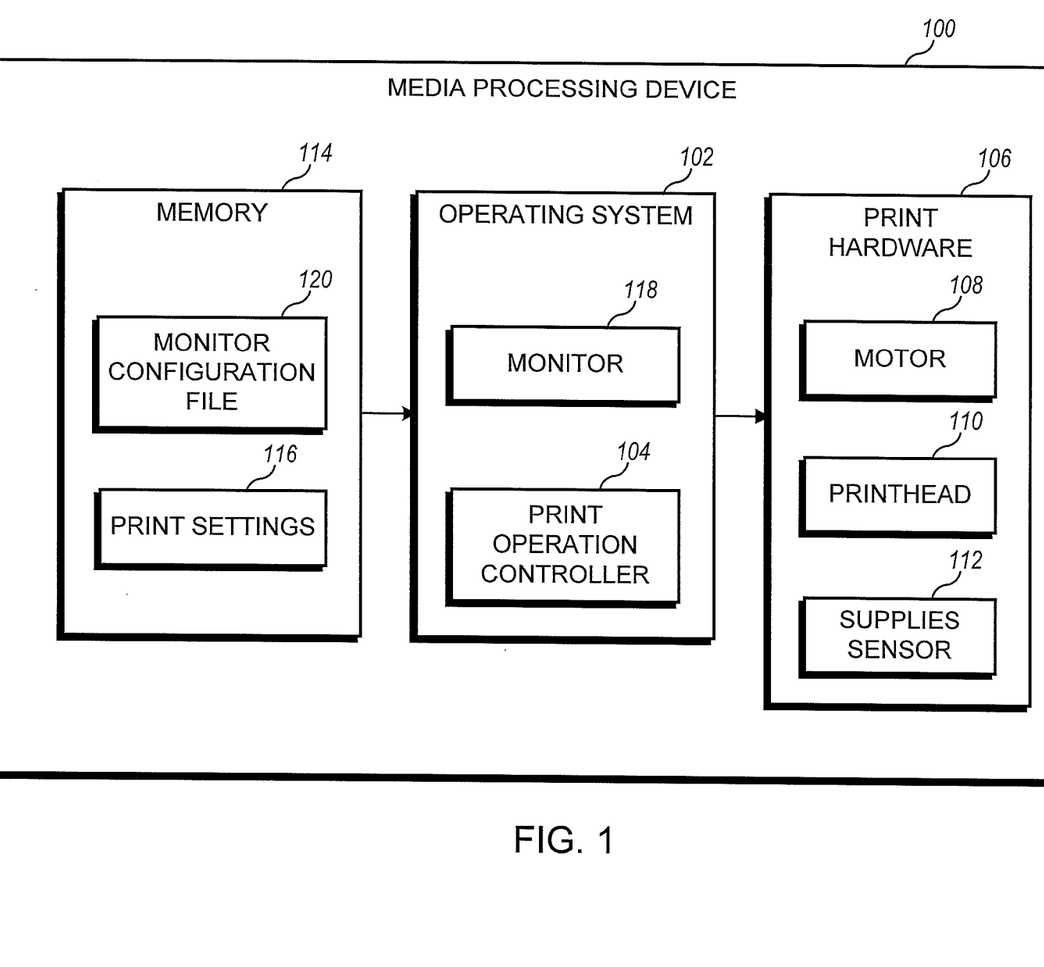
FIG. 1 is a block diagram representative of an example media processing device constructed in accordance with teachings of this disclosure.

FIG. 1 illustrates a system including an example MPD 100 constructed in accordance with teachings of this disclosure. The example MPD 100 illustrated in FIG. 1 is a printer. However, as described above, teachings of this disclosure are applicable to any device capable of performing one or more operations and communicating data associated with one or more aspects of the device.

The example MPD 100 of FIG. 1 includes an operating system 102 configured to control components of the MPD 100. In the illustrated example of FIG. 1, the operating system 102 is executed by a logic circuit (e.g., one or more processors, microprocessor(s), coprocessor(s) and/or integrated circuit(s) (e.g., an ASIC (application specific integrated circuit), or an FPGA (field programmable gate array)). The example operating system 102 implements a print operation controller 104 configured to perform print functions carried out by print hardware 106. In the example of FIG. 1, the print hardware 106 includes a motor 108 to drive media through the MPD 100, a printhead 110 to generate indicia on the media, and supplies sensors 112 to detect a position, a status, and/or an amount of consumable supplies (e.g., media and/or an ink ribbon) of the MPD 100.

The example print operation controller 104 of FIG. 1 receives data representative of printing tasks (e.g., print jobs) from memory 114 (e.g., volatile and/or non-volatile memory that may be either fixed or removable) and/or an external data source (e.g., a host device, a host system, a network device, or a removable storage device). In the illustrated example of FIG. 1, the print controller 104 processes the received data such that the data is usable by the printhead 110 to generate indicia on media being driven across the printhead 110 by the motor 108. For example, the print operation controller 104 of FIG. 1 utilizes a print engine to generate print data lines (e.g. directly or based on a bit map image) based on the received data. In the example of FIG. 1, the print operation controller 104 transmits the print data lines (or any other type of data usable to print indicia on media) and control signals (e.g., a latch signal and a strobe signal) to a printhead driver configured to control one or more operations of the printhead 110. The printhead driver translates the print data lines and the control signals into physical operations (e.g., applications of heat by select heating elements) of the printhead 110 that generate indicia on the media according to the received data.

In the illustrated example, the print operation controller 104 manages print settings 116 stored in the memory 114. In particular, the example print operation controller 104 updates and/or otherwise modifies the print settings 116 in accordance with, for example, user input and/or instructions otherwise received at the MPD 100 (e.g., from an external machine as described below). Additionally, the example print operation controller 104 references the print settings 116 when executing instructions associated with the print hardware 106. That is, the example print operation controller 104 of FIG. 1 controls operations of the print hardware 106 in accordance with the print settings 116. For example, the print settings 116 of FIG. 1 include one or more speeds for the motor 108, one or more electrical input values for the printhead 110, and/or one or more capture rates for the supplies sensor 112. Accordingly, the example print operation controller 104 of FIG. 1 enables a user of the MPD 100 itself and/or an external machine (e.g., a remote server) to control print operations (e.g., print commands and/or print setting values) of the MPD 100.

In some examples, access to the example print operation controller 104 and, thus, control over the print hardware 106 is provided to an external machine (e.g., a print management server) via an operational control connection between the MPD 100 and the external machine. In some examples, the operational control connection that provides access to the print operation controller 104 is implemented by a persistent, duplex connection such as a WebSocket. An example implementation of the operational control connection is described in detail below in connection with FIG. 4.

The example operating system 102 of FIG. 1 implements a monitor 118 configured to gather and communicate observational data associated with the MPD 100 in accordance with teachings of this disclosure. The example monitor 118 of FIG. 1 gathers observational data according to a monitor configuration file 120. The example monitor configuration file 120 of FIG. 1 is implemented by, for example, a .INI file stored in the memory 114 of the MPD 100. The example monitor configuration file 120 of FIG. 1 defines which data is to be collected by the monitor 118. For example, the monitor configuration file 120 may cause the monitor 118 to collect data indicative of an amount of unused media or an amount of unused ink ribbon remaining in the MPD 100. Additionally or alternatively, the example monitor configuration file 120 may cause the monitor 118 to collect data indicative of electrical characteristic(s) of heating elements of the printhead 110. Additionally or alternatively, the example monitor configuration file 120 may cause the monitor 118 to collect data indicative of an average print speed (e.g., in inches per second (ips)) at which the MPD 100 is generating indicia on media. Additionally or alternatively, the example monitor configuration file 120 may cause the monitor 118 to collect data indicative of a status of a power supply or data indicative of power consumption of the MPD 100. Additionally or alternatively, the example monitor configuration file 120 may cause the monitor 118 to collect data indicative of a particular print job being performed and a timestamp indicative of when the print job was performed. Additionally or alternatively, the example monitor configuration file 120 may cause the monitor 118 to collect data indicative of a modification made to the MPD 100 such as, for example, one of the print settings 116. Notably, different types of entities may be interested in different types of observational data and, thus, the monitor configuration file 120 may be configured differently by different entities. Accordingly, the example monitor 118 of FIG. 1 may collect different observational data associated with the MPD 100 for different entities.

The example monitor configuration file 120 of FIG. 1 defines intervals at which the defined data is to be collected and/or communicated. For example, monitor configuration file 120 may cause the monitor 118 to collect every type of observational data every two (2) minutes or every five (5) minutes. Alternatively, the example monitor configuration file 120 may cause the monitor 118 to collect a first type of observational data (e.g., amount of media remaining in the MPD) every one (1) minute and a second type of observational data every two (2) minutes (e.g., average motor speed).

In some examples, the MPD 100 includes prohibitions or restrictions on the collection and/or communication of observational data. For example, the MPD 100 of FIG. 1 may restrict communication of the observational data collected by the monitor 118 when communication bandwidth is reserved for a prioritized task, such as receipt of a print job. Additionally or alternatively, the example MPD 100 may cause the monitor 118 to cease collection and/or communication of observational data in response to a security alert. The example MPD 100 of FIG. 1 includes an opt-out feature that enables an entity associated with the MPD 100 to disable the collection and communication of observational data performed by the example monitor 118.

In the illustrated example of FIG. 1, the monitor configuration file 120 is initially configured by, for example, a manufacturer of the MPD 100. The example monitor configuration file 120 of FIG. 1 is initially configured with a location identifier (e.g., an electronic address) of an external machine to which the observational data is to be communicated. In some examples, the monitor configuration file 120 causes the monitor 118 to begin collection and communication of the observational data in response to the MPD 100 being powered up and the opt-out feature indicating that a user has not opted out. Additionally, in response to being powered up and the user not opting out, the monitor 118 sends a discovery packet to, for example, an external machine (e.g., a printer observation server) to which the observational data is communicated. In the illustrated example, the discovery packet is indicative of a version of the monitor configuration file 120. In some examples, the monitor configuration file 120 can be updated by, for example, the external machine that receives the discovery packet. For example, the external machine may determine that the current version of the monitor configuration file 120 is to be updated (e.g., if a user associated with the external machine desires alternative observational data than is being provided by the current monitor configuration file 120) and the external machine sends a new or updated version to the MPD 100 for use as the monitor configuration file 120. If the new or updated version of the monitor configuration 120 is authentic (e.g., as indicated by a verified signature), the example monitor 118 of FIG. 1 replaces or updates the monitor configuration 120.

In the example of FIG. 1, the monitor 118 communicates the collected observational data to one or more external machines via an observational data connection between the MPD 100 and the external machine(s). In some examples, the observational data connection utilized by the example monitor 118 is implemented by a persistent, duplex connection such as a WebSocket. In some examples, the observational data connection utilized by the example monitor 118 of FIG. 1 is a separate and distinct connection from the operational control connection that provides access to the print operation controller 102. Notably, in some examples, the observational data collected by the monitor 118 is not communicable via the operational control connection, and the print operation controller 102 is not accessible via the observational data connection. An example implementation of the monitor 118 and the corresponding observational connection is described in detail below in connection with FIG. 4.

Figure 2:
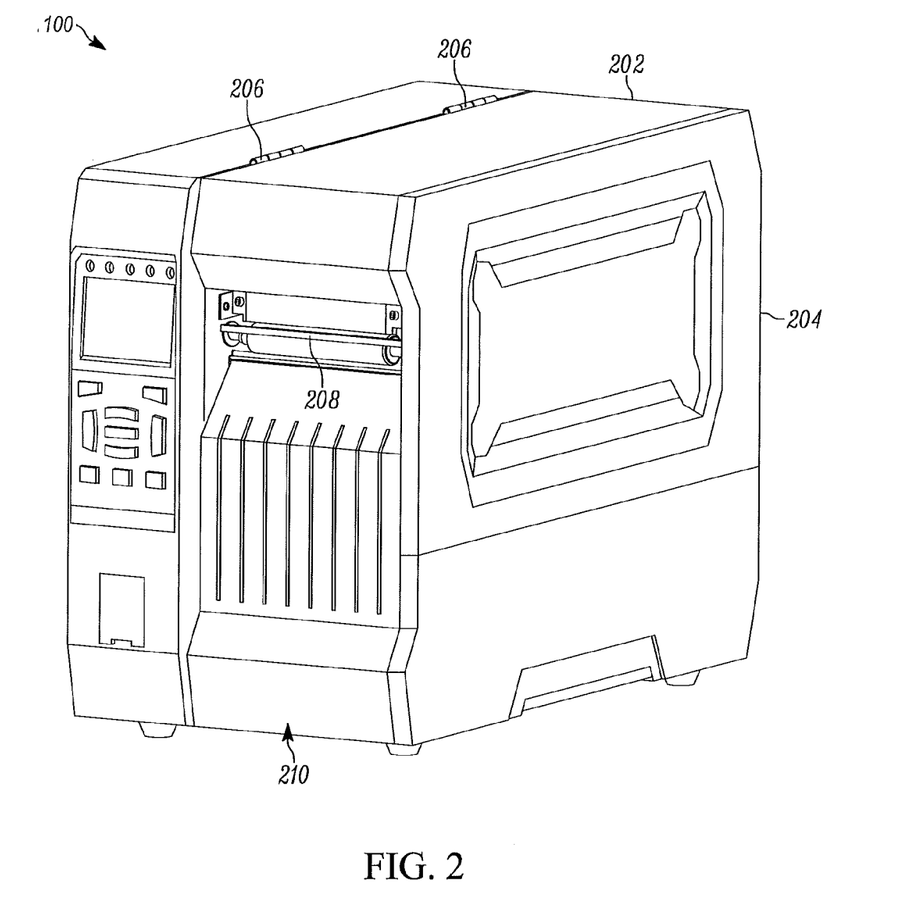
FIG. 2 is a perspective view of an example implementation of the example media processing device of FIG. 1.

FIG. 2 illustrates an example implementation of the MPD 100 of FIG. 1. The example MPD 100 of FIG. 2 is a stand-alone unit. However, teachings of this disclosure may be employed in integrated MPDs such as, for example, a scanner, an automatic teller machine (ATM), a kiosk, or a point-of-sale device. In the illustrated example of FIG. 2, the MPD 100 employs thermal printing technology (e.g., direct thermal printing technology, thermal transfer printing technology, and/or dye-sublimation thermal printing technology) to generate indicia on media. For example, the MPD 100 of FIG. 2 may be a thermal label printer. However, teachings of this disclosure may be employed in connection with any suitable printing technology.

The example MPD 100 of FIG. 2 includes a housing 202 having a door 104. As depicted in FIG. 2, the door 204 is in a closed, operational position in which access to internal components is precluded. In addition to keeping dirt, dust, and foreign objects from entering an internal cavity of the MPD 100 and potentially contaminating consumables or electronics, the door 204 may also reduce noise and prevent inadvertent touching of sensitive components. The example door 204 of FIG. 2 is hingedly attached to a frame of the MPD 100 via hinges 206 such that the door 204 can be opened to provide access to the internal components of the MPD 100. As described below in connection with FIG. 3, the frame includes a chassis to which some components of the MPD 100 are mounted. For example, as described below in connection with FIG. 3, a print mechanism mounted to the chassis generates indicia on media fed to the print mechanism by components mounted to the chassis. The print mechanism outputs the media at an exit 208 located along a front face 210 of the housing 202.

Figure 3:
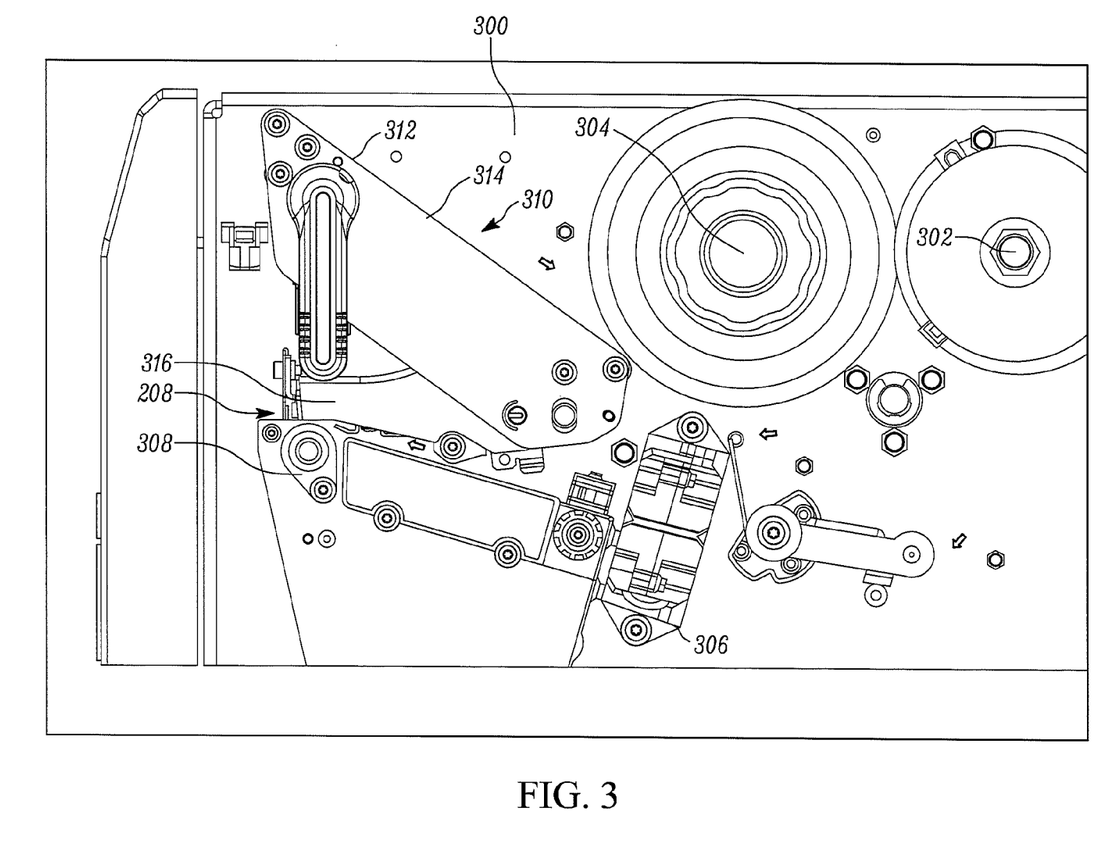
FIG. 3 is a side view of internal components of the example media processing device of FIG. 2.

FIG. 3 depicts a side view of a portion of the example MPD 100 of FIG. 2 with the door 204 removed. A view similar to that of FIG. 3 is available when the door 204 is opened. As shown in FIG. 3, a chassis 300 supports internal components including a media spindle (not shown), a plurality of guide components (e.g., rollers that guide media and/or ribbon), a ribbon supply spindle 302, a ribbon take-up spindle 304, a transmissive sensor 306, a platen assembly 308, and a print mechanism 310. In the illustrated example of FIG. 3, the print mechanism 310 includes a support structure 312 and removable covers 314 and 316 that shield the print mechanism 310. The media spindle (not shown) is configured to hold a spool of media that is fed to the print mechanism 310 and out the exit 208.

The example print mechanism 310 includes the printhead 110 of FIG. 1. The example printhead 110 has a plurality of heating elements that are referred to as dots. The dots of the printhead 110 are controlled by the printhead driver, which is implemented via a logic circuit in communication with the dots. For example, the printhead driver is implemented as a programmable gate array or by a processor capable of executing machine-readable instructions stored in memory. In accordance with data control signals received from the print controller 104, the printhead driver selectively energizes the dots of the printhead 110 to cause a change in appearance of the media fed across the printhead 110 by the motor 108. The dots of the example printhead 110 of FIG. 4 are linearly arranged. Based on the content to be printed, different dots for a given line may be turned on or off. For example, if a solid line is to be printed across the media, then all of the dots of the printhead 110 are turned on to print that line as a solid line of dot images. Energizing the printhead dots is referred to as strobing the dots and the time needed to strobe the dots for a particular print event is referred to as the strobe time. Each line of a given print job may be printed by moving the media (e.g., via the motor 108), relative to the printhead 110 and changing which dots are turned on and which does are turned off. The speed at which the media is printed is often measured in "ips," which can be related to the line strobe time required from printing individual lines in a print job. A "dot state" refers to whether or not the corresponding dot will be energized. A dot state of "on" or "1" indicates that the corresponding dot is to be energized, while a dot state of "off" or "0" indicates that the corresponding dot should not be energized. The dots of the printhead 110 are strobed according to control signals received from the print controller 104.

When the MPD 100 of FIG. 3 is configured for thermal transfer printing, thermal transfer media is mounted to the media spindle and an ink ribbon is mounted to the ribbon supply spindle 302. That is, the ribbon supply spindle 302 is configured to hold a spool of unused ribbon. The ink ribbon is fed from the ribbon supply spindle 302 to the print mechanism 310, which uses the ink ribbon to generate indicia on the media from the media spindle, which is concurrently fed to the print mechanism 310. Used ribbon travels through the print mechanism 310 and is guided to the ribbon take-up spindle 304. That is, the ribbon take-up spindle 304 is configured to hold a spool of used ribbon. The example print mechanism 310 of FIG. 3, via the printhead 110 of FIG. 1, generates indicia on the media at a nip formed by a roller of the platen assembly 308 and the printhead 110. In particular, the print mechanism 310, via the printhead driver, selectively energizes heating elements (e.g., dots) of the printhead 110 to apply heat to the ink ribbon in accordance with, for example, received print line data. At points on the thermal transfer media proximate energized heating elements of the printhead 110, ink is transferred from the ink ribbon to the thermal transfer media, thereby generating indicia on the media representative of the print line data. Depending on the type of media, a threshold number of joules per square inch or Watt*seconds per square inch is needed for the ink of the ribbon to be transferred to the media.

When the MPD 100 is configured for direct thermal printing, direct thermal media (e.g., labels including heat-sensitive dye(s)) is mounted to the media spindle (not shown). Direct thermal print media (e.g., thermochromic paper) is designed and manufactured such that when a threshold amount of energy is applied to the media, a chemical reaction occurs in the media that causes a change in appearance (e.g., a change in color from white to black). In the example of FIG. 3, the direct thermal media is fed from the media spindle to the print mechanism 310. In such instances, the direct thermal media is not accompanied by an ink ribbon through the print mechanism 310. Instead, in direct thermal mode, the printhead 110 selectively applies heat directly to the direct thermal media fed across the printhead 110, thereby causing a change in appearance of the media at selective locations on the direct thermal media. Depending on the type of media, a threshold number of joules per square inch or Watt*seconds per square inch is needed for a chemical reaction to occur in the direct thermal media to thereby cause a change in appearance of one or more portions of the media.

Figure 4:
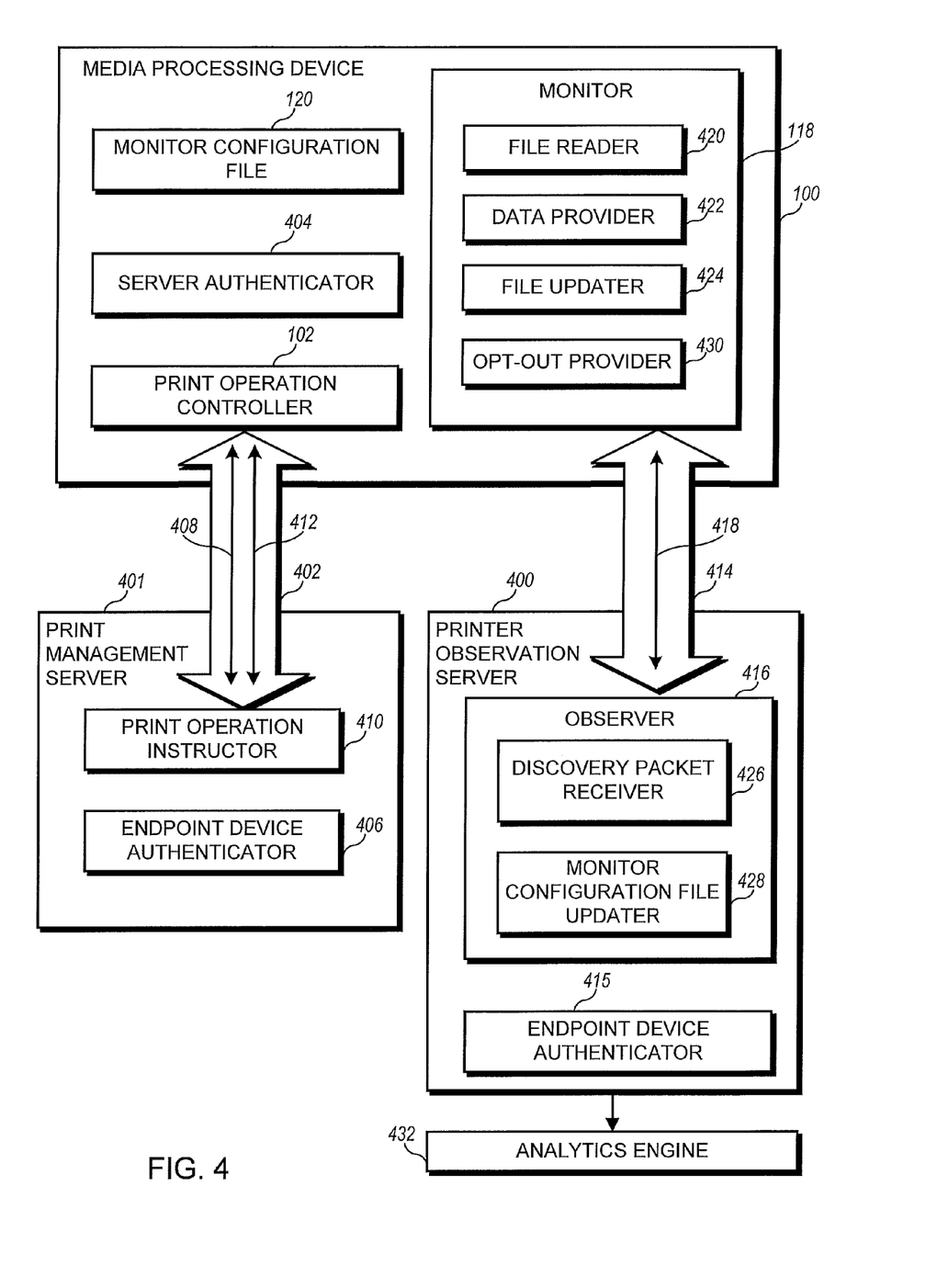
FIG. 4 is a block diagram representative of an example implementation of the media processing device of FIG. 1 and a printer observation server constructed in accordance with teachings of this disclosure.

FIG. 4 illustrates an example implementation of the MPD 100 of FIG. 1 in communication with an example implementation of a printer observation server 400 constructed in accordance with teachings of this disclosure. While the example of FIG. 4 includes the printer observation server 400, teachings of this disclosure may be implemented to place the example MPD 100 in secure communication with any suitable type of external device.

In the example of FIG. 4, a first persistent connection is established between the MPD 100 and a print management server 401. The example first persistent connection of FIG. 4 is referred to herein as an operational control connection 402. In the example of FIG. 4, the operational control connection 402 is implemented by a respective WebSocket established via an authentication process. To perform the authentication process, a server authenticator 404 of the example MPD 100 cooperates with an endpoint device authenticator 406 of the print management server 401. In particular, when the MPD 100 is connected to a network and powered on the server authenticator 404 sends a connection request to the print management server 401 using a data communication protocol or request-response protocol, such as an HTTP or HTTPS request (e.g., over TCP port 80 or 443). In some examples, one or more external devices (e.g., remote servers) are identified using defined variables or settings stored in the memory 114 of the MPD 100. The connection request indicates to the print management server 401 that the MPD 100 desires to use Transport Layer Security (TLS) or Secure Socket Layer (SSL) to provide a secure channel between the MPD 100 and the print management server 401. In the illustrated example, the connection request further indicates that the connection should be upgraded to a WebSocket connection, which includes one or more bi-directional, persistent communication channels). Such a connection request is recognized as or treated as a standard web browser request, such as a communication between a web browser and a web site. The endpoint device authenticator 406 indicates whether or not the connection request is accepted by the print management server 401.

If the endpoint device authenticator 406 indicates that the connection request is denied, an error message is generated by the MPD 100. If the endpoint device authenticator 406 accepts the connection request, the endpoint device authenticator 406 sends a security certificate and connection parameters to the MPD 100. In some examples, the security certificate is only valid if the security certificate is signed by a designated certificate authority (CA), such as the manufacturer of the MPD 100. The designated CA-signed certificate is used to ensure that the MPD 100 only connects to trusted and approved external devices. The server authenticator 404 evaluates the received security certificate. For example, the server authenticator 404 analyzes data in the security certificate to ensure that the MPD 100 is connecting to the expected external device by, for example, verifying that the DNS name in the certificate matches the URL used to send the connection request. In some examples, the server authenticator 404 further evaluates the security certificate to ensure that the security certificate is signed by the expected CA, such as the manufacturer of the MPD 100.

If the server authenticator 404 does not accept the security certificate received from the print management server 401, the MPD 100 generates an error message. If the server authenticator 404 accepts the security certificate received from the print management server 400, the server authenticator 404 sends a security certificate stored on the MPD 100 to the print management server 401 to provide authentication to the print management server 401. The endpoint device authenticator 406 evaluates the security certificate received from the MPD 100 to ensure that the security certificate is signed by the expected CA and that the MPD 100 is one of the MPDs with which the print management server 401 expects to make connections (e.g., a particular type of MPD, an MPD of a particular manufacturer, or an MPD residing on a particular network).

If the endpoint device authenticator 406 accepts the security certificate received from the MPD 100, the operational control connection 402 of FIG. 4 is established by, for example, the print management server 401 upgrading the connection to the WebSocket protocol. With the secure, persistent operational control connection 402 in place, the MPD 100 and the print management server 401 are capable of sending data to each other using, for example, JSON and/or SGD.

In some examples, the MPD 100 and the print management server 401 establish multiple different communication channels over the operational control connection 402. In the illustrated example of FIG. 4, a first communication channel 408 is established over the operational control connection 402 and is dedicated to the exchange of data corresponding to the print settings 116 of the MPD 100. As described above, the print operation controller 102 of the MPD 100 enables external access to the print settings 116. In the example of FIG. 4, the print management server 401 includes a print operation instructor 410 that uses the first communication channel 408 to instruct the print operation controller 102 to, for example, modify the print settings 116. Notably, in the example of FIG. 4, the first communication channel 408 is restricted to the type of data that enables the print operation instructor 410 to modify the print settings 116 via the print operation controller 102. As such, the first communication channel 408 of FIG. 4 may be referred to herein as a print settings channel.

In the illustrated example of FIG. 4, a second communication channel 412 is established over the operational control connection 402 and is dedicated to print commands sent by the print management server 401 to the MPD 100. As described above, the print operation controller 102 of the MPD 100 enables external access to one or more functions of the print hardware 106. In the example of FIG. 4, the print operation instructor 410 that uses the second communication channel 412 to instruct the print operation controller 102 to, for example, perform one or more print functions (e.g., execute a print job) via the print hardware 106. Notably, in the example of FIG. 4, the second communication channel 412 is restricted to the type of data that enables the print management server 401 to control printing operations of the MPD 100. As such, the second communication channel 412 of FIG. 4 may be referred to herein as a print operation channel.

In the illustrated example of FIG. 4, a second persistent connection, referred to herein as an observational data connection 414, is established between the MPD 100 and the printer observation server 400. In the example of FIG. 4, the observational data connection 414 is separate and independent from the operational control connection 402. In the example of FIG. 4, the observational data connection 414 is implemented by a WebSocket established via an authentication process. Accordingly, the example operational control connection 402 of FIG. 4 is implemented by a first WebSocket and the example observational data connection 414 of FIG. 4 is implemented by a second WebSocket different and independent from the first WebSocket. Alternatively, the operational control connection 402 is implemented by one type of persistent connection and the observational data connection 414 is implemented by another, different type of persistent connection.

In the illustrated example, the observational data connection 414 is authenticated by the authentication process described above as implemented by the server authenticator 404 and the endpoint device authenticator 406 of the print management server 401. However, in the illustrated example, the printer observation server 400 includes an endpoint device authenticator 415 that authenticates the MPD 100 in a similar manner as the endpoint device authenticator 406 of the print management server 401. In some examples, the operational control connection 402 is authenticated via a first session of the authentication process and the observational data connection 414 is authenticated via a second, different session of the authentication process. Alternatively, the observational data connection 414 and the operational control connection 402 may each have a different authentication process.

In the example of FIG. 4, the monitor 118 utilizes the observational data connection 414 to communicate data indicative of, for example, one or more statuses and/or performance of the MPD 100 to an observer 416 of the printer observation server 400. In the illustrated example of FIG. 4, the observational data connection 414 includes a communication channel 418 dedicated to the observational data provided by the monitor 118 to the observer 416. Notably, the observational data connection 414 is prevented from communicating data capable of controlling or changing any operation of the MPD 100. For example, the observational data connection 414 is prevented from communicating data that controls a print operation (e.g., a print command or a print setting modification) of the MPD 100. Rather, the observational data connection 414 and the communication channel 418 thereof are limited to communicating the observational data provided by the monitor 118 to the observer 416, which cannot influence or control any print operation of the MPD 100. Put another way, the monitor 118 and the observer 416 are non-active or passive elements with respect to print operations and print functionality of the MPD 100, while the print operation instructor 410, the print operation controller 102 and any other element communicating data over the operational control connection 402 are active elements with respect to print operations and print functionality of the MPD 100.

In the illustrated example of FIG. 4, the monitor 118 includes a file reader 420 to determine the content of the monitor configuration file 120. The example monitor configuration file 120 of FIG. 1 is initially configured by a manufacturer to include the type of observational data to collect and communicate, the interval(s) at which to collect and/or communicate the observational data, a signature to send to the printer observation server 400 in conjunction with the observational data, and an identifier (e.g., address) of the printer observation server 400 such that the observational data is conveyed to the printer observation server 400 upon the MPD 100 powering up. The example file reader 420 of FIG. 4 obtains the corresponding values of the monitor configuration file 120.

The example monitor 118 of FIG. 4 includes a data provider 422 that uses the obtained values from the monitor configuration file 120 to collect and store the appropriate data at the appropriate intervals. Additionally, the example data provider 422 communicates the collected and stored observational data to the observer 416 via the observational data connection 414 in accordance with the contents of the monitor configuration file 120. In some examples, the data provider 422 appends the signature to the observational data such that the observer 416 can verify the authenticity of the received observational data.

In some examples, before communicating the observational data to the observer 416, the data provider 422 determines whether one or more prohibitive conditions are present on the MPD 100. An example prohibitive condition is that the MPD 100 is currently receiving and/or processing print instructions that are prioritized over the observational data communications to be conveyed via the observational data connection 414. Another example prohibitive condition is that the MPD 100 is sending an amount of observational data that exceeds a threshold and/or that the MPD 100 is sending the observational data at a rate that exceeds a threshold. If the data provider 422 determines that at least one prohibitive condition exists, the data provider 422 ceases communication of the observational data until non prohibitive conditions are present. In some examples, the prohibitive conditions are defined in a portion of the memory 114 of the MPD 100.

The example monitor 118 of FIG. 4 includes a file updater 424 that updates, replaces, or otherwise modifies the monitor configuration file 120. In the example of FIG. 4, a version indicator of the monitor configuration file 120 is provided to, for example, the observer 416. In particular, upon establishment of the observational data connection 414, the example file updater 424 sends a discovery packet to a discovery packet receiver 426 of the observer 416. The discovery packet sent by the example file updater 424 informs the discovery packet receiver 426 of a current version of the monitor configuration file 120 on the MPD 100. In the example of FIG. 4, the discovery packet is conveyed from the MPD 100 to the discovery packet receiver 426 via the observational data connection 414.

The example observer 416 includes a monitor configuration file updater 428 of that determines, based on the received discovery packet, whether the current version of the monitor configuration file 120 is to be updated (e.g., modified or replaced). For example, one or more entities receiving information from the monitor 118 may desire different observational data and/or may desire the observational data at different intervals. If so, the monitor configuration file communicator 428 generates an update to the monitor configuration file 120 and/or a new version of the monitor configuration file 120 and conveys the same to the MPD 100. In particular, the monitor configuration file communicator 428 receives input from the one or more entities that desire additional or alternative observational data and generates the update and/or new version of the monitor configuration file 120 based on the received input. In some examples, the update and/or new version of the monitor configuration file 120 includes or has appended thereto a signature generated by the printer observation server 400.

The example file updater 424 of the MPD 100 receives the signed update and/or new version of the monitor configuration file 120 and, if the corresponding signature is authentic, modifies the content of the monitor configuration file 120 and/or deletes the old version and stores the new version. In the illustrated example of FIG. 4, the file updater 424 sends another discovery packet to the printer observation server 400 after modifying the monitor configuration file 120 in accordance with the updated received from the monitor configuration file updater 428. The example data provider 422 of FIG. 4 collects and communicates the observational data to the printer observation server 400 in accordance with the updated and/or new monitor configuration file 120 via the observational data connection 414.

The example monitor 118 of FIG. 4 includes an opt-out provider 430 to enable an entity associated with the MPD 100 to opt out of the collection and/or communication of observational data. For example, the opt-out provider 430 may present an option to a user via an interface such that the user is able to provide input indicative of a desire to opt out. Additionally or alternatively, the opt-out provider 430 may receive an opt-out instruction via a network communication.

In the illustrated example of FIG. 4, the printer observation server 400 provides the observational data collected via the observational data connection 414 to an analytics engine 432. The example analytics engine 432 of FIG. 4 uses the observational data to, for example, generate one or more reports and/or alerts regarding one or more aspects of the MPD 100. While the example of FIG. 4 includes the analytics engine 432, additional or alternative entities may be provided with the observational data provided by the example monitor 118 of FIG. 4.

Figure 5:
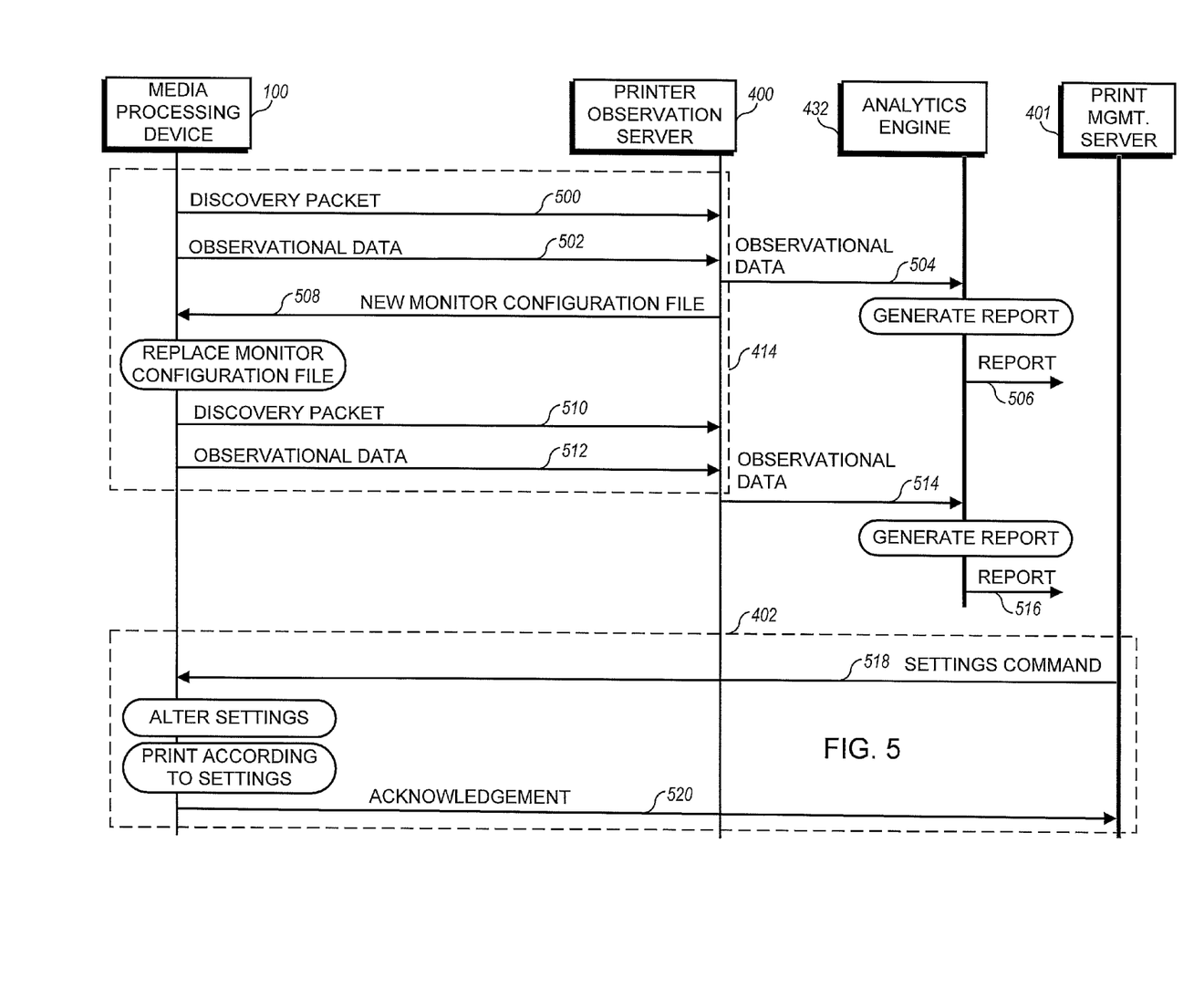
FIG. 5 is a message diagram representative of example communications associated with the example of FIG. 4.

FIG. 5 is an example messaging diagram associated with the example of FIG. 4. In the example of FIG. 5, upon establishment of the observational data connection 414, the file updater 242 of the MPD 100 sends the discovery packet 500, which is an indicator of a current version of the monitor configuration file 120, to the printer observation server 400. In the example of FIG. 5, the data provider 422 of the monitor 118 is initially configured, according to the monitor configuration file 120 as read by the file reader 420, to collect observational data 502 from one or more elements of the MPD 100 and to communicate the observational data 502 to the printer observation server 400. The example printer observation server 400 sends a first message 504 including the observational data 502 and data associated with the discovery packet 500 to the analytics engine 432. The analytics engine 432 generates a first report 506 and conveys the first report 506 to one or more entities such as, for example, an owner of the MPD 100 that desires performance and/or status data regarding the MPD 100.

In the example of FIG. 5, the monitor configuration file updater 428 of the observer 416 determines that the monitor configuration file 120 is to be updated and sends a second message 508 including a new monitor configuration file 508 to the MPD 100. The file updater 424 of the monitor 118 responds with by replacing the current version of the monitor configuration file 120 with the new monitor configuration file 120. In the illustrated example, the file updater 424 replaces the current version of the monitor configuration file 120 with the received new version received in the second message 508.

The example file updater 424 sends another discovery packet 510 to the printer observation server 400 that is indicative of the new version of the monitor configuration file 120. The example file reader 420 reads the new monitor configuration file 120 to determine which observational data to collect and at which intervals to collection the observational data. The data provider 422 collects and communicates the observational data 512 in accordance with the findings of the filer reader 420. As such, the observational data 502 is collected and communicated to the printer observation server 400 in accordance with one version of the monitor configuration file 120, and the observational data 512 is collected and communicated to the printer observation server 400 in accordance with another version of the monitor configuration file 120.

Notably, in the example of FIG. 5, the discovery packets 500 and 510, the observational data 502, the message 508 including the new version of the monitor configuration file 120, and the observational data 512 are communicated via the observational data connection 414. As described above, the example observational data connection 414 of FIG. 4 is prevented from communicating any other type of data, such as data that control an operation of the print hardware 104 of FIG. 1.

In the example of FIG. 5, the printer observation server 400 sends the analytics engine 432 a third messing 514 including the observational data 512 collected in accordance with the new version of the monitor configuration file 120 and information of the discovery packet 510. The analytics engine 432 generates a report 516 based on the third message 514 and communicates the report 516 to, for example, an entity that provided the new version of the monitor configuration file 120.

In the example of FIG. 5, the print operation instructor 410 of the print management server 400 sends a settings command 518 to the MPD 100 that includes a modification of the print settings 116. Alternatively, the example print operation instructor 410 may send the MPD 100 a print command that causes the print hardware 104 to perform one or more print functions. In the example of FIG. 5, the print operation controller 102 alters the print settings 116 in accordance with the received setting command 518. Further, the example print operation controller 102 prints according to the modified print settings 116. As such, the print operation instructor 410 controls a print operation of the MPD 100. In the example of FIG. 5, the MPD 100 sends the print management server 400 an acknowledgment message 520 indicating that the modification to the print settings 116 is complete.

Notably, the settings command 518 and the acknowledgement 520 are communicated via the operational control connection 402. As described above, in some examples, the operational control connection 402 is prevented from communicated the observational data collected and communicated by the monitor 118 via the observational data connection 414.

Figure 6:
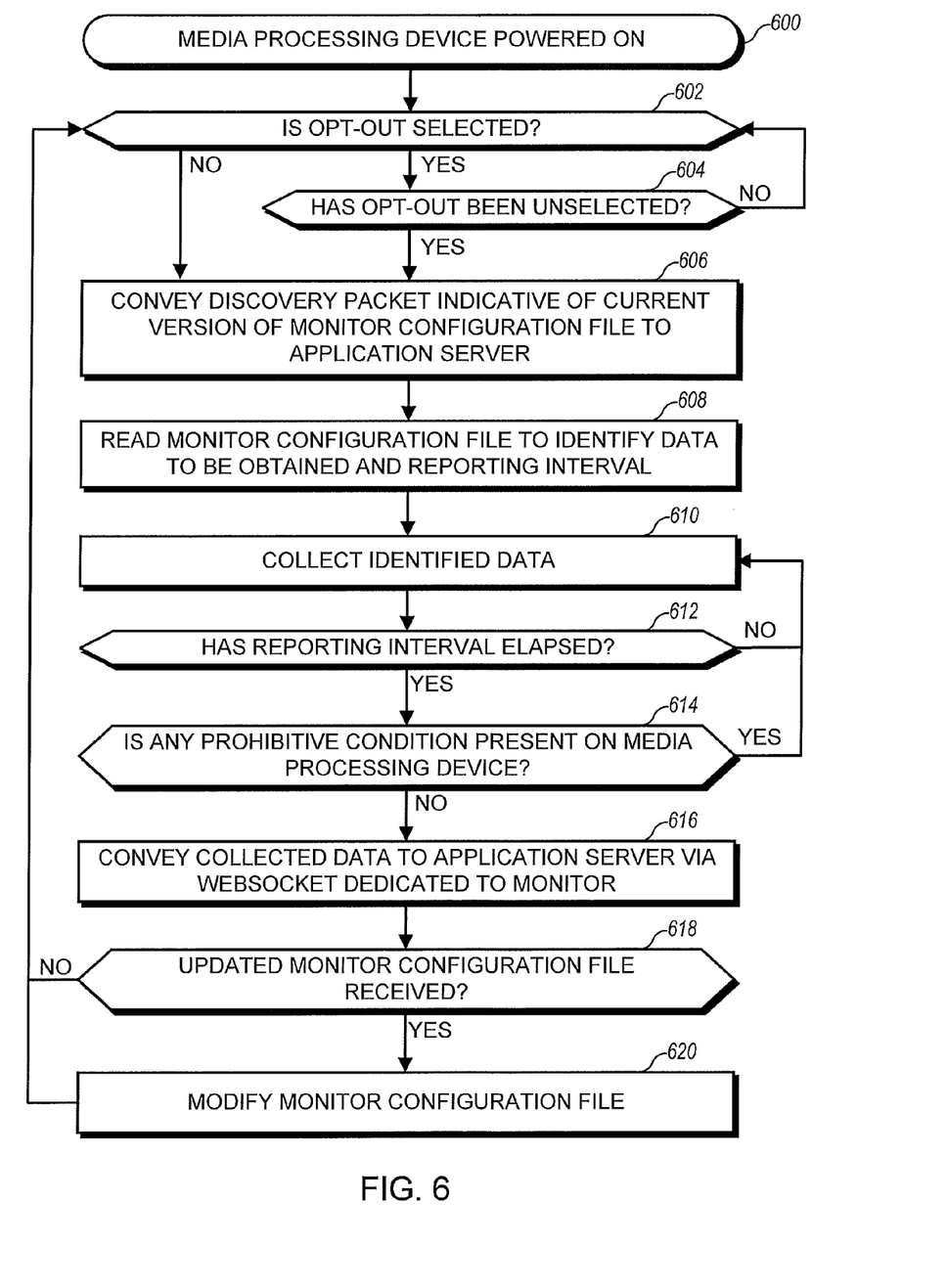
FIG. 6 is a flowchart representative of example operations that may be executed to implement the example monitor of FIGS. 1 and/or 4.

FIG. 6 is a flowchart illustrative of an example method implemented by the example monitor 118 and/or, more generally, the example MPD 100 of FIGS. 1 and 4. In the example of FIG. 6, the MPD 100 is powered on (block 600). In the example of FIG. 6, the monitor 118 determines whether the opt-out provider 430 has been utilized to disable the collection and/or communication of observational data (block 602). If so, the example monitor 118 periodically determines whether the opt-out option is no longer selected (block 604) and, if so, control proceeds to block 606.

When the opt-out option is not selected or if the opt-out option has been unselected, the file updater 424 of the monitor 118 conveys a discovery packet to the printer observation server 400 (block 606). In the illustrated example, the discovery packet is indicative of a version of the monitor configuration file 120 currently stored on the MPD 100. As described below, the printer observation server 400 may send an instruction to replace or otherwise modify the monitor configuration file 120. For example, the printer observation server 400 may determine that the current version of the monitor configuration file 120, as indicated by the conveyed discovery packet, is to be altered such that the monitor 118 collects and communicates data associated with different aspect(s) of the MPD 100.

The file reader 420 of the monitor 118 reads the contents of the monitor configuration file 120 to determine, for example, which type of observational data is to be collected and at which interval to collect the observational data (block 608). The example filer reader 420 provides the results to the data provider 422, which collects the identified observational data (block 610). The example data provider 422 determines whether the reporting time interval defined in the monitor configuration file 120 has elapsed (e.g., since the last conveyance of observational data) (block 612). If the time interval has not elapsed, the data provider 422 continues collecting the observational data (block 610).

If the time interval has elapsed, the data provider 422 determines whether any prohibitive conditions (e.g., insufficient available communication bandwidth or an amount of observational data to be conveyed that exceeds a threshold) are present on the MPD 100 (block 614). If at least one prohibitive condition is present (block 614), the data provider 422 continues collecting observational data (control proceeds to block 610). If no prohibitive condition is present (block 614), the example data provider 422 conveys the collected observational data to the printer observation server 400 via the observational data connection 414 (block 616).

In the example of FIG. 6, the file updater 424 determines whether the monitor configuration file updater 428 has conveyed an updated and/or new version of the monitor configuration 120 to the file updater 424. If the file updater 424 receives such data and the data is verifiably authentic (block 618), the file updater 424 updates, replaces, or otherwise modifies the monitor configuration file 120 (block 620). Control then proceeds to block 604.

Figure 7:
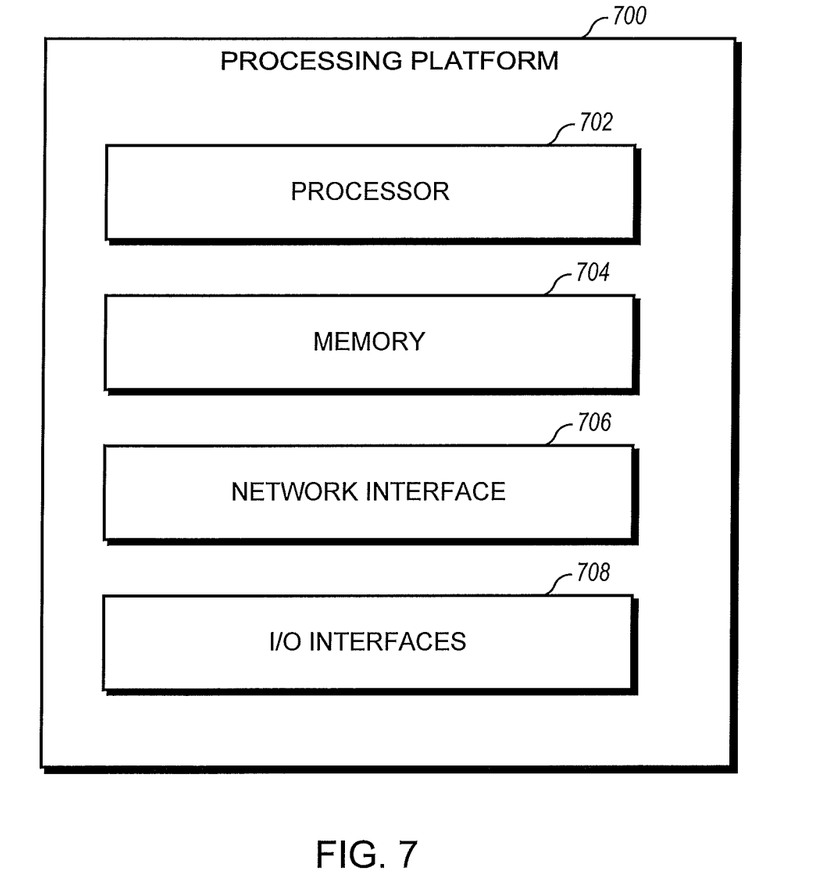
FIG. 7 is a block diagram of an example logic circuit capable of executing instructions to implement, for example, the example monitor of FIGS. 1 and/or 4, the example print controller and/or operating system of FIG. 1, and/or the example printer observation server and/or analytics engine of FIG. 4.

FIG. 7 is a block diagram representative of an example logic circuit that may be utilized to implement, for example, the example monitor 118 of FIGS. 1 and/or 4, the example server authenticator 404 of FIG. 4, the example print operation controller 102 of FIGS. 1 and/or 4, the example file reader 420 of FIG. 4, the example data provider 422 of FIG. 4, the example file updater 424 of FIG. 4, the example opt-out provider 430 of FIG. 4, or, more generally, the example MPD 100 of FIGS. 1 and/or 4. Additionally or alternatively, the example logic circuit of FIG. 7 may be utilized to implement the example observer 416 of FIG. 4, the example print operation instructor 410 of FIG. 4, the example endpoint device authenticator 406 of FIG. 4, the discovery packet receiver 426, the monitor configuration file updater 428 of FIG. 4, and/or, more generally, the example printer observation server 400 of FIG. 4. The example logic circuit of FIG. 7 is a processing platform 700 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 700 of FIG. 7 includes a processor 702 such as, for example, one or more microprocessors, controllers, and/or any suitable type of processor. The example processing platform 700 of FIG. 7 includes memory (e.g., volatile memory, non-volatile memory) 704 accessible by the processor 702 (e.g., via a memory controller). The example processor 702 interacts with the memory 704 to obtain, for example, machine-readable instructions stored in the memory 704 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 700 to provide access to the machine-readable instructions stored thereon.

The example processing platform 700 of FIG. 7 includes a network interface 706 to enable communication with other machines via, for example, one or more networks. The example network interface 706 includes any suitable type of communication interface(s) (e.g., wired and/or wireless interfaces) configured to operate in accordance with any suitable protocol(s).

The example processing platform 700 of FIG. 7 includes input/output (I/O) interfaces 708 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A media processing device residing on a network, the media processing device comprising:
   a monitor configured to:
      collect observational data associated with the media processing device in accordance with a configuration file stored on the media processing device; and
      communicate the observational data to a first device external to the network via a first persistent connection between the media processing device and the first external device; and
   a controller configured to:
      receive an operational instruction from a second external device via a second persistent connection between the media processing device and the second external device, wherein:
         the second persistent connection is independent of the first persistent connection; and
         the second persistent connection has a first channel and a second channel; and
      implement the operational instruction on the media processing device, wherein the operation instruction controls media processing hardware of the media processing device, and wherein at least one of the monitor and the controller is implemented via a logic circuit.

2. A media processing device as defined in claim 1, wherein the first persistent connection is a first WebSocket having one channel, and the second persistent connection is a second WebSocket including two or more channels.

3. A media processing device as defined in claim 1, further comprising an authenticator to establish the first persistent connection via a first authentication session, and to establish the second persistent connection via a second authentication session.

4. A media processing device as defined in claim 1, wherein the first persistent connection is prohibited from communicating data capable of controlling the media processing hardware.

5. A media processing device as defined in claim 1, wherein the monitor is configured to communicate the observational data in accordance with an interval defined in the configuration file.

6. A media processing device as defined in claim 1, wherein the monitor is configured to, via the first persistent connection, convey an indicator of a version of the configuration file to the first external device.

7. A media processing device as defined in claim 1, wherein the monitor is configured to, in response to receiving an update from the first external device via the first persistent connection, modify the configuration file.

8. A media processing device as defined in claim 1, wherein the monitor is configured to provide an opt-out option to disable the collecting of the observational data.

9. A media processing device as defined in claim 1, wherein the observational data is a type of data unable to control the operation of the media processing hardware.

10. A media processing device as defined in claim 1, wherein the monitor is to determine whether a prohibitive condition is present before communicating the observational data via the first persistent connection.

11. A media processing device as defined in claim 1, wherein the operational instruction is a print command and the media processing hardware includes a printhead.

12. A media processing device as defined in claim 1, wherein the operational instruction is a modification of a print setting, and the media processing hardware is controlled by the print setting.

13. A method for use in a media processing device residing on a network, the method comprising:
   collecting, via a logic circuit of the media processing device, observational data associated with the media processing device in accordance with a configuration file stored on the media processing device;
   communicating, via the logic circuit, the observational data to a first device external to the network via a first persistent connection between the media processing device and the first external device; and
   in response to receiving an operational instruction from a second external device via a second persistent connection between the media processing device and the external device, implementing the operational instruction on the media processing device, wherein:
      the second persistent connection is independent of the first persistent connection;
      the second persistent connection has a first channel and a second channel; and
      the operational instruction controls media processing hardware of the media processing device.

14. A method as defined in claim 13, wherein the first persistent connection is a first WebSocket having one channel, and the second persistent connection is a second WebSocket including two or more channels.

15. A method as defined in claim 13, further comprising establishing the first persistent connection via a first authentication session, and establishing the second persistent connection via a second authentication session.

16. A method as defined in claim 13, wherein the first persistent connection is prohibited from communicating data capable of controlling the media processing hardware.

17. A method as defined in claim 13, wherein communicating the observational data comprises communicating the observational data in accordance with an interval defined in the configuration file.

18. A method as defined in claim 13, further comprising conveying an indicator of a version of the configuration file to the first external device via the first persistent connection.

19. A method as defined in claim 13, further comprising, in response to receiving an update from the first external device via the first persistent connection, modifying the configuration file.

20. A method as defined in claim 13, further comprising providing an opt-out option to disable the collecting of the observational data.

21. A method as defined in claim 13, wherein the observational data is a type of data unable to control the media processing hardware.

22. A method as defined in claim 13, further comprising determining whether a prohibitive condition is present before communicating the observational data via the first persistent connection.

23. A method as defined in claim 13, wherein the operational instruction is a print command and the media processing hardware includes a printhead.

24. A method as defined in claim 13, wherein the operational instruction is a modification of a print setting, and the media processing hardware is controlled by the print setting.

25. A tangible machine-readable medium comprising machine-readable instructions that, when executed, cause a machine to at least:
- collect observational data associated with the media processing device in accordance with a configuration file stored on the media processing device;
- communicate the observational data to a first device external to the network via a first persistent connection between the media processing device and the first external device;
- receive an operational instruction from the external device via a second persistent connection between the media processing device and a second external device, wherein the second persistent connection is independent of the first persistent connection, and the second persistent connection has a first channel and a second channel; and
- implement the operational instruction on the media processing device, wherein the operational instruction controls media processing hardware of the media processing device.

26. A media processing device as defined in claim 1, wherein the first channel is dedicated to a first type of operational instruction, and the second channel is dedicated to a second type of operational instruction different than the first type of operational instruction.

27. A method as defined in claim 13, wherein the first channel is dedicated to a first type of operational instruction, and the second channel is dedicated to a second type of operational instruction different than the first type of operational instruction.

* * * * *